Figure 1:
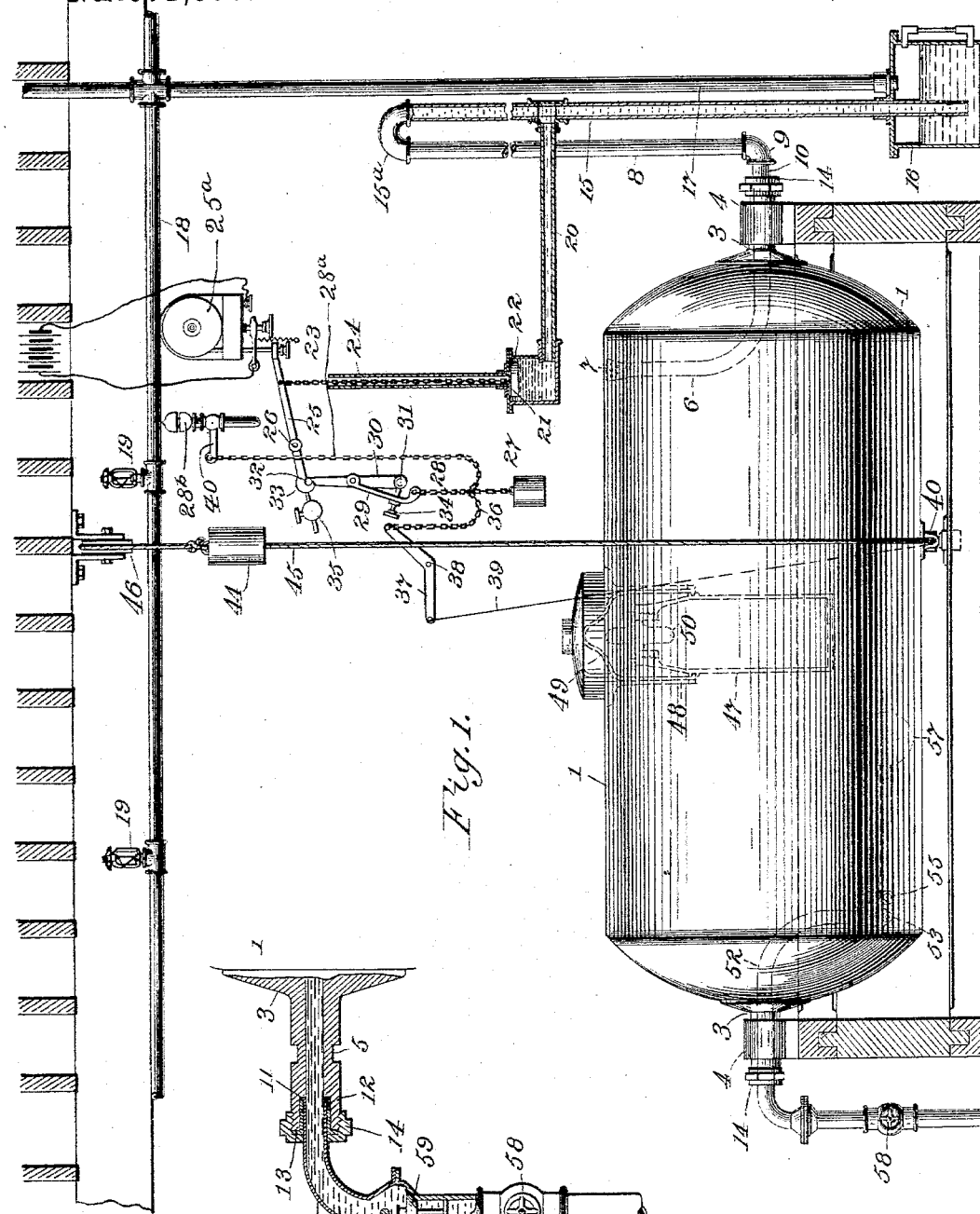

(No Model.) 5 Sheets—Sheet 3.

G. H. ROBINSON & E. F. STECK.
AUTOMATIC FIRE EXTINGUISHING SYSTEM

No. 571,578. Patented Nov. 17, 1896.

WITNESSES:

INVENTORS,
GEORGE H. ROBINSON,
AND ERNST F. STECK,
BY
THEIR ATTORNEYS.

(No Model.) 5 Sheets—Sheet 4.

G. H. ROBINSON & E. F. STECK.
AUTOMATIC FIRE EXTINGUISHING SYSTEM.

No. 571,578. Patented Nov. 17, 1896.

WITNESSES:

INVENTORS,
GEORGE H. ROBINSON
AND ERNST F. STECK,
BY
THEIR ATTORNEYS.

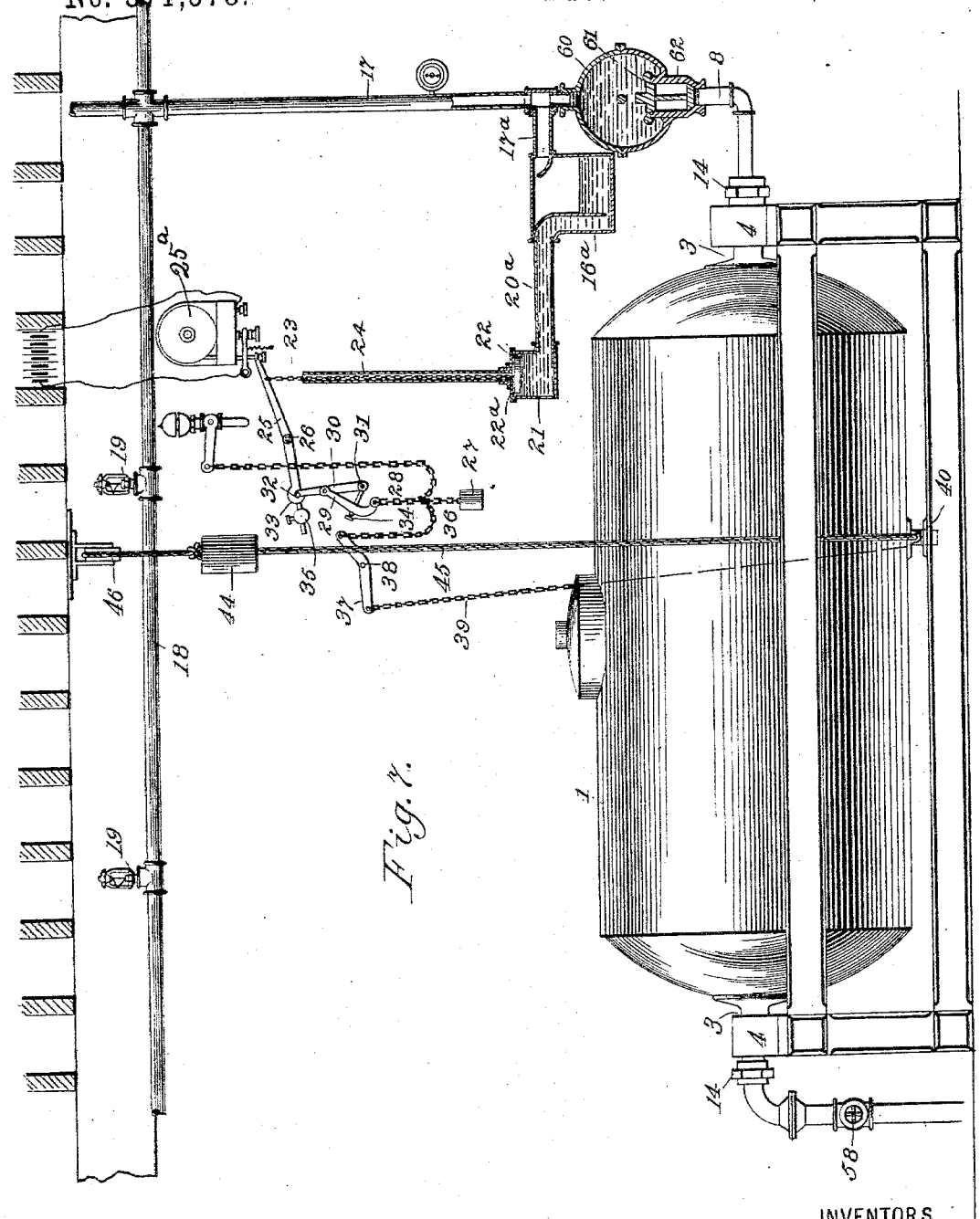

UNITED STATES PATENT OFFICE.

GEORGE H. ROBINSON, OF NEW YORK, N. Y., AND ERNST F. STECK, OF CHICAGO, ILLINOIS, ASSIGNORS TO THE FIRE EXTINGUISHER MANUFACTURING COMPANY, OF CHICAGO, ILLINOIS, AND NEW YORK, N. Y.

AUTOMATIC FIRE-EXTINGUISHING SYSTEM.

SPECIFICATION forming part of Letters Patent No. 571,578, dated November 17, 1896.

Application filed April 10, 1896. Serial No. 586,903. (No model.)

*To all whom it may concern:*

Be it known that we, GEORGE H. ROBINSON, residing at New York, in the county and State of New York, and ERNST F. STECK, residing at Chicago, in the county of Cook and State of Illinois, citizens of the United States, have invented certain new and useful Improvements in Automatic Fire-Extinguishing Systems, of which the following is a specification.

The object of the present invention is to produce a system of fire-extinguishing apparatus which will meet the double requisite of quickness of initial application, together with endurance of discharge, whereby the violence of the initial application, which will be generally sufficient to suppress the conflagration, will be aided in case of its insufficiency by a practically unlimited assistance through and by virtue of a secondary supply of extinguishing fluid.

It is a well-known fact and is conceded among insurance men that a sufficiency of initial pressure upon the extinguishing fluid operating and discharging through sprinklers will, in most cases, secure the necessary result, and it is one of the objects of this present invention to utilize this fact, and in connection with it to arrange a further or secondary supply in case the initial supply is insufficient to discharge its functions and secure the desired result.

To this end the invention consists, broadly, in providing a chemical fire-extinguisher which in the present case shall be known as the "primary source" of the fire-extinguishing fluid, and which may be set in operation by the means hereinafter shown and described or by any other suitable means, and in uniting therewith a secondary supply, which may communicate with a supply-tank, the city main, or any other source, and which in the present case will be referred to as the "secondary source of supply," the parts being so connected and constructed as that when, by automatic means or otherwise, the chemical apparatus is set in operation the chemical action will cause the discharge of the extinguishing fluid through the pipe system, and will be followed, as will be described, by the discharge of the secondary supply, or in the failure of the discharge of the primary supply the secondary supply will operate immediately and independently. We employ one and the same means for bringing both supplies into action either successively, simultaneously, or independently. The object and the value of such an apparatus are apparent. Not only will the propulsive effect of the fluids which reside in the chemical apparatus immediately attach and become operative, but the secondary supply will also be immediately available and will automatically follow the primary supply of fluid, and, failing the efficacy, as from some accidental cause, of the primary supply, the secondary supply will instantly supplant it and flow through the discharging-pipes, as will be explained. This statement, broadly speaking, represents the basis of the present invention, and in the specification, illustrated by the drawings hereto attached, the means and method will be fully disclosed and explained for carrying the invention into effect, but no limitation is intended to be placed upon the invention by reason of any specific description or drawing; and it is to be understood that the discovery consists in the idea of uniting these two, ordinarily speaking, independent and very different means of extinguishing fires into one system, whereby the high-pressure chemical supply will discharge first and will be followed by the secondary, and in the case of accident to the primary source, of bringing immediately into action, not as a supplement, but as a substitute, the secondary supply.

The particular apparatus to be employed may be varied from time to time as new exigencies present themselves, and one advantage of the invention consists in its adaptability to alteration without departing from the spirit of the invention. For instance, and in a general way, fire-extinguishing apparatuses of different kinds may be set in operation either by manual or by automatic means, and the method and apparatus and system forming the subject of this application may with equal advantage be adapted to any of the different and various methods. It may be employed, as will be explained and as will be readily seen in connection with the drawings hereinafter to be referred to, with any of the well-known means for manually setting the fire-extinguishing apparatus into operation, as, for instance, by a mechanical pull through chain, rope, or lever, or by relief of fluid under pressure taking place through a fusible sprinkler or otherwise.

To simplify the description of the invention and to illustrate the same by a preferred method of carrying the invention into effect the last-named method has been employed as the most desirable means of accomplishing the results intended, and therein we have made several important improvements, which will duly appear.

To these ends there is introduced into the pipe systems employed to distribute the extinguishing fluid throughout the area which they are intended to cover a certain amount of air or gas, which may be maintained at a pressure varying with the exigencies of the situation and depending upon the water column, hereinafter referred to, that is to be controlled. This pressure may vary from five pounds upward. We will refer to it herein as the compressible fluid, or the fluid under pressure. Upon the pipes for distributing the extinguishing fluid are arranged sprinklers of any desired shape, although in connection with the present invention a certain improved form is preferred, such improvement being shown, described, and claimed in applications filed by Ernst F. Steck, Serial No. 586,937, entitled "Automatic sprinkler for fire-extinguishing systems," filed April 10, 1896, and Serial No. 589,666, filed April 30, 1896, entitled "Automatic sprinkler for fire-extinguishing systems." These fusible sprinkling apparatuses are adapted to operate by melting and liberating the suppressed fluid at a temperature approximately 160° Fahrenheit. The pressure of air in the distributing-pipe maintains the column of liquid under a movable float, which, when the said pressure is removed, as by burning out of the fuse and the opening of the vent or valve of the sprinkler, releases the liquid, permitting the float to drop, and this, through intermediate devices, throws the machine into action. It is accomplished by any suitable mechanism, and the same mechanism can be employed to ring an alarm or blow a whistle, or both.

The initial step in the active operation of the fire-extinguishing apparatus in the present case consists in the starting and liberation of the primary supply of extinguishing fluid, to wit, the fluids contained in the chemical apparatus. One method of carrying this part of the invention into effect is shown in the accompanying drawings, but the invention is not limited to the use of this particular apparatus, but is intended to cover and refer to any chemical apparatus employing fluids for generating high-pressure gases, such as sulfuric acid and alkaline water. In connection with this chemical apparatus and the setting in operation of the chemical extinguishing fluid—namely, the primary supply—the secondary supply may flow from the city water-main or from a tank under pressure or upon a roof immediately, or as soon as the back pressure in the chemical apparatus permits, into the chemical apparatus and therethrough into the same set of distributing-pipes.

Figure 2:
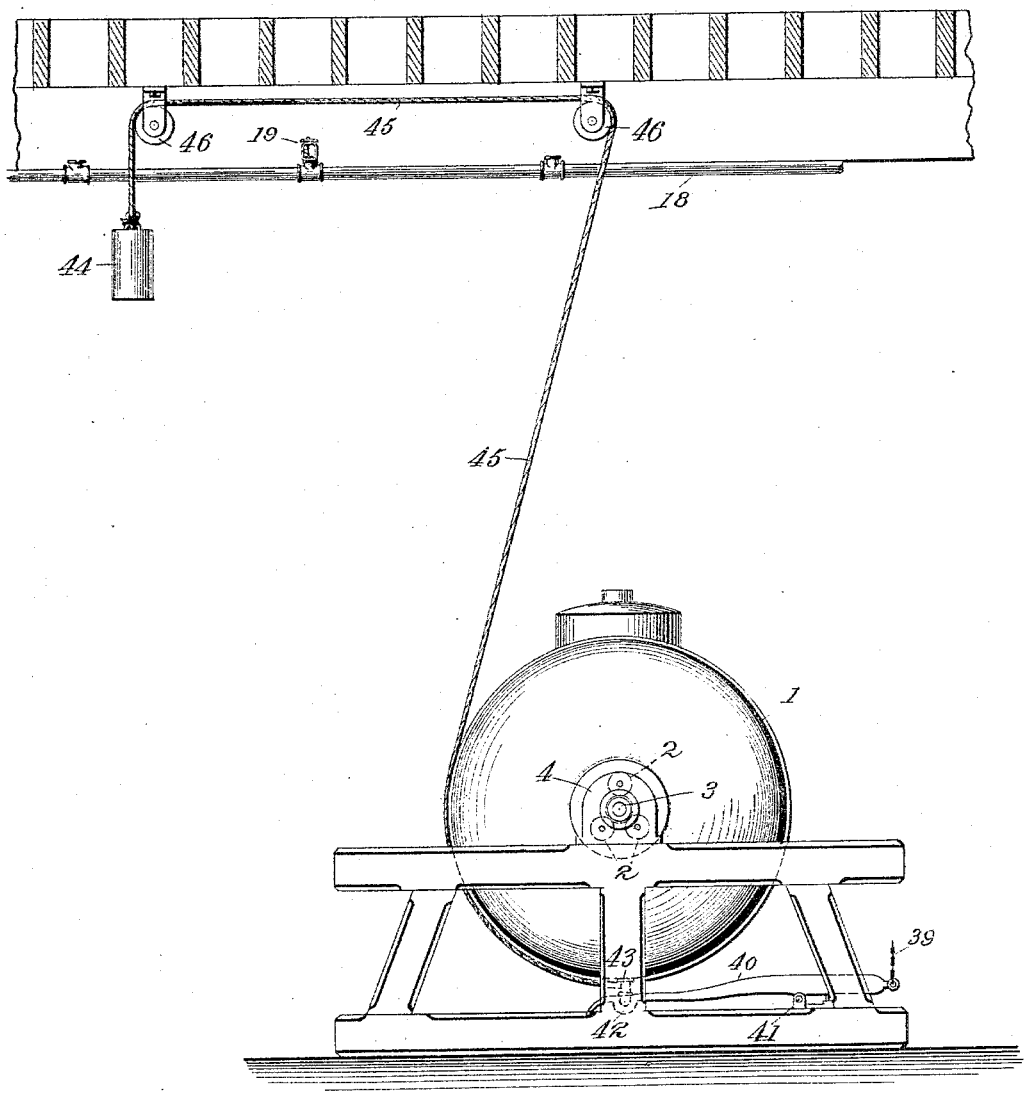
Figure 3:
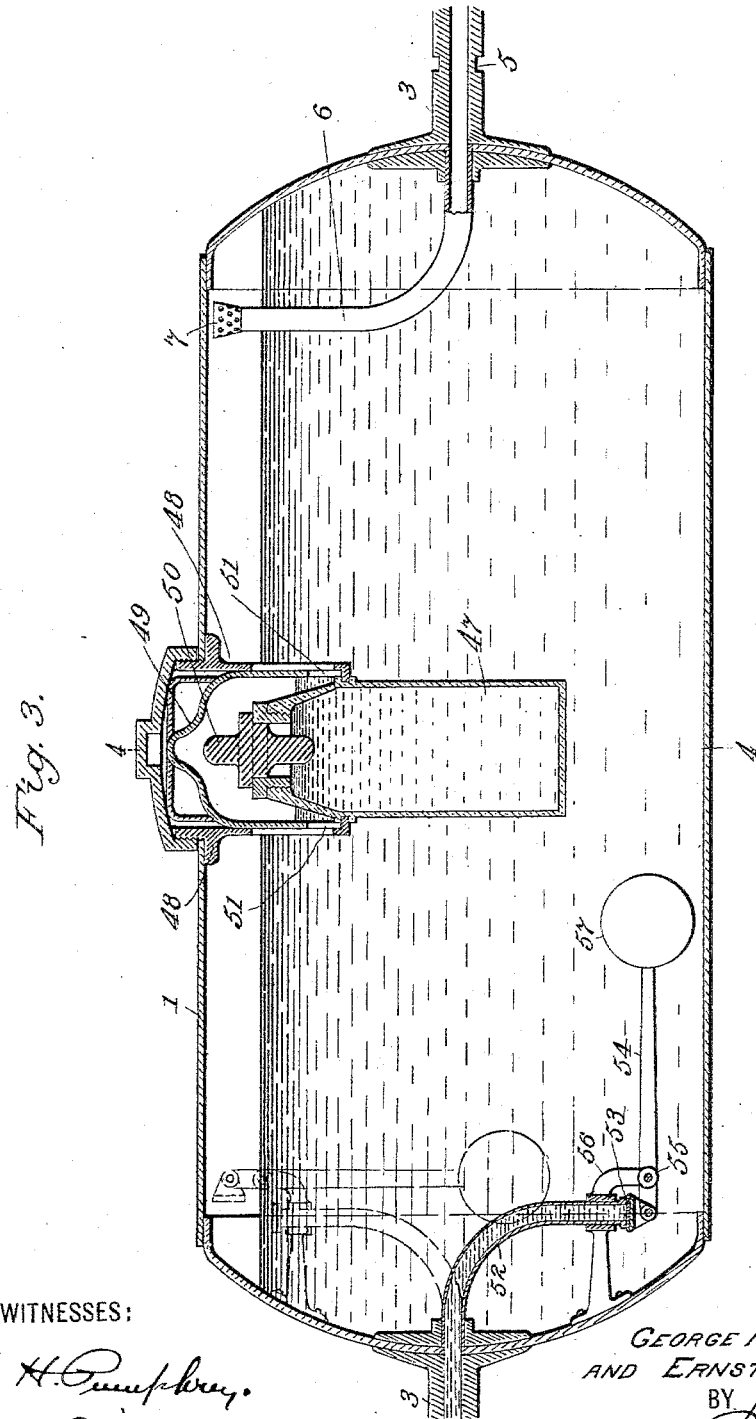
Figure 4:
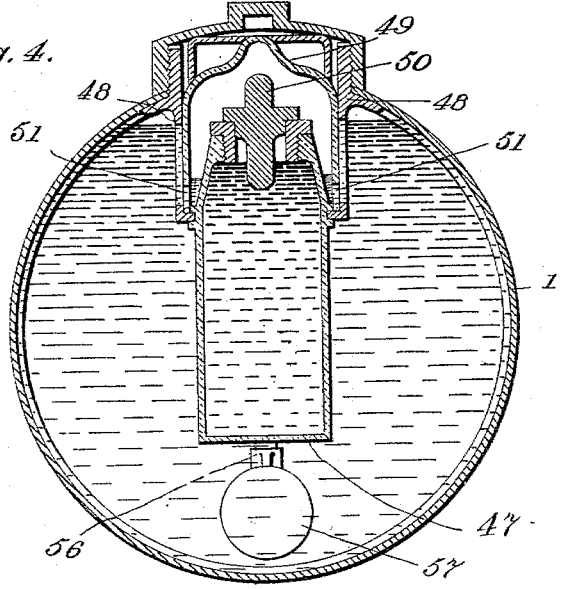
Figure 5:
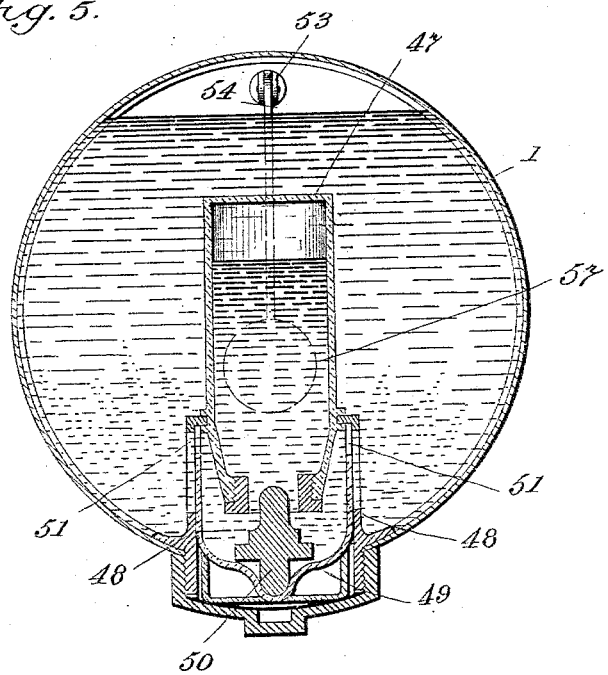

Referring to the accompanying drawings, which form a part of this specification, Figure 1 is a view in elevation of one embodiment of the system, certain parts of the apparatus being shown in section. Fig. 2 is an end elevation of the cylinder and its tripping and rotating mechanism. Fig. 3 is a longitudinal sectional view, on an enlarged scale, of the cylinder. Fig. 4 is a cross-sectional view of the same, taken on the line 4 4 of Fig. 3. Fig. 5 is a similar view showing the acid-containing jar inverted and the escape of the acid therefrom. Fig. 6 is a sectional detail view, and Fig. 7 illustrates a modified form of our system.

In the drawings, 1 represents a cylinder or other suitable vessel for holding the alkaline water employed in chemical fire-extinguishing apparatus. This cylinder is adapted to make a half-rotation and is mounted, therefore, upon antifriction-rollers 2, which support trunnions 3, said antifriction-rollers being held in supports 4 and working in grooves 5 of the said trunnions. Through one of these trunnions extends the pipe 6. This pipe is fixedly secured upon the inside of the cylinder 1 and terminates at its upper end in a perforated cap 7, ordinarily located, as shown, above the surface of the contained fluid. This pipe 6 also extends outwardly through the hollow or tubular trunnion, the said tubular trunnion being practically a continuation of it, the trunnion, pipe, and the cylinder all being adapted to turn together and fixedly secured to one another.

The pipe 8 constitutes an extension of the pipe 6 and is formed separately from it. The pipe 8 is provided at 9 with an elbow and at 10 with a horizontal extension, which extension enters the aforesaid tubular trunnion 3. This horizontal extension terminates at a point 11, being there slightly turned up in order to form a slight rim.

Between the extensions 12 of the trunnion and the pipe 10 are placed packings or washers 13, and we secure the parts together by means of the lock-nut 14, screwed on the trunnion. These particular parts are shown in cross-section in detail view Fig. 6. The pipe 8 connects with the pipe 15, as shown, by means of a gooseneck 15ª, the pipe 15 constituting what we term a "standing pipe," ordinarily filled with water or other fire-extinguishing fluid. This pipe 15 dips into a tank 16, the latter being partially filled with the same fluid, as shown, and extending nearly to the bottom thereof. The said tank 16 is connected by means of the pipe 17 with the system of distributing-pipes 18. The pipes 18 may extend in any direction and through any number of floors and be of any number, size, and shape. At 19 on said pipes are provided fusible sprinklers adapted to operate by melting the fuse upon the temperature of the room reaching approximately, say, 160° Fahrenheit. In the pipes between these fusible sprinklers and the tank 16 is placed atmospheric air or other gas or compressible fluid under five pounds pressure or thereabout or under a pressure desirable in the particular situation, which pressure serves to keep the contained liquid in the tank and in the standing pipe 15 back, as shown.

Connected to the standing pipe 15 is a horizontal pipe 20, terminating at its farther end in a vessel 21. The water in the standing pipe flows into this horizontal pipe 20 and into the vessel 21, to which it is connected. At the top of the vessel when the apparatus is in its normal condition is located float 22, maintained there by the water, which in turn is held to its position by the superimposed air. It is ordinarily held under these circumstances at the top of the vessel, and it is so shown in the drawings. The float 22 is provided with a chain or cable 23, extending vertically upwardly from it and working in a sleeve or stand-pipe 24. This float is connected to a lever 25, pivoted at 26, said lever 25 being adapted to release the operating mechanism and to discharge various other functions, such as setting into operation the alarm-bell 25ª.

It is to be distinctly understood that the float 22 is maintained in its upper position by its own buoyancy, and sufficient space is left around it and between it and the inner walls of the vessel 21 to effect an easy clearance.

The operating mechanism consists of a weight 27, suspended by the chain 28 to an arm 29 upon the lever 30, the latter being pivoted to and adapted to swing on the pin 31. The lever 30 is also provided with a lug 32, over which a hook 33 of the lever 25 is arranged to catch. Adjusting screws and weights are shown at 34 and 35. The chain 28 is provided with a branch chain 28ª, connected to a whistle 28ᵇ, and also with a branch chain 36, which is attached to one end of a bell-crank lever 37, pivoted at 38. To the other end of this bell-crank lever is attached another chain 39, which serves to operate a tripping-lever (shown at 40.) This lever is pivoted at 41 and provided with a hook 42, which engages a pin 43 of the bottom of the cylinder 1.

At 44 is provided a weight connected by a rope 45, supported in pulleys 46, to the bottom of the cylinder 1. When the catch-lever 40 is withdrawn from the retaining-hook 43, the weight 44 serves to give the cylinder a half-rotation necessary in order to upset the containing apparatus. This apparatus consists of a jar 47, supported in a frame 48 and suspended from the top of the cylinder 1. This jar contains the sulfuric acid, and the cylinder 1 contains the alkaline water. The particular form of jar herein shown constitutes subject-matter for a separate application of Ernst F. Steck, entitled "Chemical fire-extinguisher," Serial No. 589,665, filed April 30, 1896; but it may be stated that it has a liquid seal and a glass sealing-cap 49 in addition to the lead stopper 50.

If there is any tendency, as there always is more or less, for slight leakage of the acid-jar, it will be taken up by the liquid seal and will be gradually absorbed by the alkaline water, to which it has access through the apertures 51. By this means the disintegrating effect which such acid would have by creeping over the edge or surface of the water and reaching the metallic sides of the containing-cylinder 1 will be obviated and removed.

The above specific description constitutes and covers what is termed herein the "primary source of fluid," which is, as stated, the result of the chemical apparatus. This part of the system operates in the following manner: When the fuse upon the sprinkler releases the contained air in the pipes, the water in the standing pipe 15 immediately descends as the pressure is released from the surface of the water in the tank 16. The water in the pipe 15 descending causes the withdrawal of the water in the pipe 20 and the consequent immediate descent of the float 22. The descent of the float will, through the mediation of the described mechanism, release the weight 27, which, descending, turns the bell-crank lever 37 and causes the tripping of the cylinder-locking mechanism. The weight 44 immediately comes into play upon the tripping of the lock, causing the cylinder 1, through the mediation of rope 45, to give a half-rotation. As the cylinder turns over and assumes the position indicated in Fig. 5 the lead stopper 50 falls away and the contained acid escapes into the alkaline water with the well-known result, creating the necessary high pressure in the cylinder 1 and causing an immediate and violent discharge of the chemically-charged fluid through the conduit consisting of pipes 6, 8, and 15, and thus on to the system of distributing-pipes and through the liberating-sprinklers. This is the operation of the chemically-operating fluid supply referred to herein also as the "primary" or "high-pressure" fluid supply.

We will now proceed to describe the secondary fluid supply and its manner of connection with the primary and its methods of operation, which may be, as before stated, either successive, concurrent, or independent. The farther end of the containing-cylinder 1 is provided with a trunnion similar in construction to the one hereinbefore described. The trunnions 3 are mounted upon antifriction-rollers 2, said antifriction-rollers being held in supports 4 and working in the grooves 5 of the said trunnions. Through this trunnion extends a pipe 52, elbow-shaped, as shown, and being provided at its lower end with a common rubber valve 53, mounted upon a lever 54, pivoted at 55 to an arm 56. This lever has at its outer end a weight 57. When the apparatus is in the normal position, as shown in Fig. 1, the weight lies near the bottom of the cylinder 1 and effects the requisite closure of the valve and prevents inflow of the secondary supply of water into the primary supply under normal conditions. At 58 we show a stop-cock for shutting off the secondary supply altogether or turning it on, as may be wished. At 59 is a check-valve preventing the backflow of the primary supply into the secondary supply when the former is in active operation.

We will now proceed to describe the operation of the secondary supply in connection with the operation of the primary supply. When the action heretofore described has taken place in connection with the primary supply, it will be seen that upon the upsetting of the cylinder 1 by giving it the half-rotation aforesaid and the generation of the high-pressure fluid the valve-controlling apparatus between the primary and secondary supplies will, by operation of gravity, open the valve 53 between the secondary and primary supplies. The check-valve remains closed, however, so long as the back pressure of the primary supply preponderates over the pressure in the secondary supply. When, however, the chemical primary supply is partially exhausted and a parity of pressures is established, the check-valve will, upon a slight succeeding preponderance of pressure in the secondary supply, lift the check-valve and cause a flow of fluid from the secondary supply through the connecting-pipe into the cylinder 1, and therethrough and without obstruction of any kind into the latter's normal exit and to the distributing-pipes and released sprinklers.

It will be apparent from the above description that the supply of extinguishing fluid will, so far as its pressure is concerned, never fall below the pressure of the secondary supply, for as soon as a preponderance of pressure is established in the secondary supply the latter will immediately become effective, and such pressure will thereafter be always constant; and also it will be seen that the fluid which remains in the primary source will be discharged into the distributing-pipes by the mechanical rush of the inflowing secondary supply and at a pressure equal to the pressure of such secondary supply, which is supplanting it and carrying it forward.

It will be seen from the foregoing description that we have shown and described a primary source of fluid supply which is necessarily of a high pressure, charged also with carbonic-acid gas, which under ordinary circumstances is sufficient to extinguish a fire, and in connection therewith have arranged a secondary supply, which, in a comparative sense, is a low-pressure supply, and which is adapted in case of insufficiency of the primary supply to operate successively, as described. Also the two supplies operate in a sense conjointly for the reason that before the primary supply is entirely exhausted and when the pressure in the secondary supply slightly preponderates it will flow into the cylinder 1, and the two supplies will combine and flow through the distributing-pipes and through the released sprinklers, as aforesaid. Also when by reason of any accident the acid-containing vessel fails to discharge it contents in the alkaline-water chamber the secondary supply will, through the operation of the gravity-valve, flow immediately into the cylinder 1 and therethrough mingled with the alkaline water into the common exit and through the distributing-pipes aforesaid. In this sense the secondary supply supplants the primary supply and is in a manner independent of it.

When in the specification or claims we refer to high pressures and low pressures or high-pressure supplies and low-pressure supplies, it is to be understood that the expressions are merely relative and that it is not intended to convey the idea that the secondary supply is really a low-pressure supply, but simply a low pressure compared to the primary supply, the latter being, as is well known, extremely violent, especially in its initial application. It will also be seen that by the uniting of these two systems, what may be called the "chemical" and "mechanical" systems, a gradual and easy substitution is secured and in an entirely automatic manner. It will also be seen that whereas from the very nature of the case the primary supply, though of high pressure, is limited, the secondary supply, if it be connected to the city main, though of a lower pressure, is practically unlimited. It will also be seen from the description and drawings that the high-pressure chemical supply automatically holds in check the low-pressure supply until it is ready, by reason of decrease in resisting power, to release it. It will also be seen that although we have shown and described our invention in connection with a particular automatic system for setting it in operation, yet to one skilled in the art other means may be employed for producing like results either automatically or by manual operation. For instance, in the modified form of apparatus shown in Fig. 7 the pipe 17 opens into a chamber 60, containing liquid, as shown, and provided with a valve 61, seating on the rim of the neck 62. The pipe 8 connects with the lower end of this neck. At 16$^a$ is a tank containing liquid under pressure, the pipe 17$^a$ connecting same with pipe 17. Pipe 20$^a$ connects the vessel 21 with the tank 16$^a$ at a point near the bottom of the latter. When the fluid-pressure is released, the operating mechanism will work as in the former case, the valve 61 will rise, and the extinguishing fluid will flow out. We therefore do not limit ourselves to the exact means and apparatus shown and described, but desire to have it understood that our invention and the claims following the specification may cover any suitable apparatus for carrying our ideas into effect.

It will be understood that the liquid column is forced backwardly by the compressed air or fluid between the liquid and the fusible sprinklers, and the liquid will hold the float 22 in its upper position. The liquid will thus form and constitute a counterbalance for the compressed fluid-pressure in front of it and which resides in the distributing-pipes and between the liquid and the fusible sprinklers. Thus it will be seen that the pressure in the distributing-pipes will cause the liquid in the tank 16 to maintain a constant upward pressure and hold the float in elevated position, and this pressure in the compressible fluid in the pipes may be so gaged or regulated as to raise the column in the pipe 15 to a point near the upper end of the gooseneck $15^a$, so that any slight variation of the pressure in the piping system will not affect the position of the float 22, but will be taken by or counterbalanced by the pressure of the column in the pipe 15, such pipe 15 being a sufficient height to render it unnecessary to gage the pressure to a nicety or to require inspection at short intervals. The gooseneck $15^a$ provides for any overflow in a contrary direction.

In order to prevent leakage of the liquid from the vessel 21, the upper side of the float is provided with a suitable gasket $22^a$, which constitutes a valve, and leakage may be further guarded against by providing the upper side of the vessel with a sleeve or stand-pipe 24 of substantially equal height with the pipe 15, so that even though the liquid should leak above the float 22 it would have to rise above the column in the pipe 15, and hence could not escape. With this construction it will be seen that the compressible fluid in the distributing-pipes 18 and in the connecting-pipe 17 really controls the operation and releasing devices, while the liquid located between the releasing mechanism and the compressible fluid and which constitutes the immediate means of operation affords at the same time a counterbalance for the compressible fluid, as explained.

Having thus described our invention, what we claim, and desire to secure by Letters Patent, is—

1. A fire-extinguishing system consisting of the combination of a series of fluid-distributing pipes normally free from liquid and containing a gas under low pressure, with a high-pressure primary fluid supply and a secondary fluid supply at lower pressure, means for throwing said primary supply into action, means whereby the low-pressure supply is thrown into condition for action by the same act, and means whereby the excess of pressure of the primary supply will restrain the flow from the secondary supply until the primary supply is partially exhausted, substantially as described.

2. The combination of the dry distributing-pipes, the chemical supply communicating therewith, the secondary liquid supply in communication with the chemical supply and having a normally-closed valve for holding it in check, and a single operating means held in check by the air in the dry pipes, and constructed to simultaneously set in operation the chemical supply and open the said valve of the secondary supply, substantially as shown and described.

3. A fire-extinguishing system consisting of the combination of a series of fluid-distributing pipes, with a primary chemically-operating fluid supply and a secondary fluid supply constructed and arranged substantially as shown and described, the primary fluid-supplying apparatus being an intermediate part in that system of consecutive channels which extends from the source of the secondary supply to the outlets of the fluid-distributing pipes, and means for setting the primary and secondary supply apparatus into action simultaneously, as and for the purposes set forth.

4. A fire-extinguishing system consisting of the combination of a series of fluid-distributing pipes, with a primary chemically-operating fluid supply, a containing-cylinder, a secondary fluid supply connected by a pipe to the primary supply, a valve on said pipe, and means for upsetting the cylinder of the primary apparatus and simultaneously opening the valve.

5. A fire-extinguishing system having in combination a partially-rotatable cylinder or receptacle for containing an extinguishing fluid and gas-producing substances held in separation, the piping system connected with said cylinder, a pipe or passage adapted to be connected with a head of fluid under pressure and having communication with said cylinder, and a valve for closing communication between said cylinder and pipe, opened by the movement of said cylinder, substantially as set forth.

6. A fire-extinguishing system having in combination a partially-rotatable cylinder for containing extinguishing fluid and gas-producing chemicals held in separation, the pipe system connected therewith, the secondary supply also communicating with said cylinder and having a check-valve opening under pressure from the secondary supply, and a second valve for closing communication between said cylinder and secondary supply located at a point between the cylinder and check-valve and connected with and operated by said rotating cylinder, substantially as set forth.

7. A fire-extinguishing system consisting of the combination of a series of fluid-distributing pipes, with a secondary fluid supply and a primary chemically-operating fluid supply connected to the secondary supply and to the pipe system as shown, suitable valves between the primary and secondary supplies, and means for upsetting the chemical apparatus and means for opening said valves by the act of upsetting whereby the opening of said valves will create a free channel from the secondary supply through the primary apparatus to the pipe system.

8. A fire-extinguishing system consisting of the combination of a series of fluid-distributing pipes provided with one or more fusible sprinklers, a source or sources of extinguishing fluid or fluids, means for causing the discharge of said extinguishing fluids, a float connected to such means, a seat for said float and a liquid-retaining column extending above said seat and held to the seat by a compressible fluid situate between the liquid and the fusible sprinklers.

9. A fire-extinguishing system having in combination a source or sources of extinguishing fluid, means for setting same in operation, the pipe system connected with said source or sources charged with a liquid counterbalance whereby the operative means are controlled, fluid-pressure in said pipes acting as a counterbalance for said liquid counterbalance, and a liquid-feeding column, whereby the elevation of the liquid counterbalance remains constant under certain changes of condition, substantially as shown and described.

10. A fire-extinguishing system having in combination a source or sources of extinguishing fluid, means for setting same in operation, the piping system, a gooseneck having one end connected with said source or sources and forming an overflow, a chamber into which the other end of said gooseneck dips and from the upper side of which the piping system rises, a vessel communicating with said gooseneck and chamber and being located below the upper end of said gooseneck, and a float in said vessel connected with said operating means, substantially as set forth.

11. A fire-extinguishing system having in combination a source or sources of extinguishing fluid, a gooseneck connected with said source or sources at one end, a chamber into which the other end of the gooseneck dips, the piping system rising from said chamber, a vessel located below the upper end of said gooseneck and communicating therewith, a float located in said vessel and having a connection with said operating means, and a stand-pipe rising from said cylinder around said connection for catching leakage, substantially as set forth.

GEORGE H. ROBINSON.
ERNST F. STECK.

Witnesses to signature of George H. Robinson:
A. J. DUNHAM,
WM. B. DONNELL.

Witnesses to signature of Ernst F. Steck:
E. J. MITCHELL,
O. T. DOOLITTLE.